9/6/83 XR 4,402,574

United States Patent [19]

McConnel

[11] 4,402,574

[45] Sep. 6, 1983

[54] METHOD AND APPARATUS FOR REFRACTING A LASER BEAM

[75] Inventor: Ronald J. McConnel, Seattle, Wash.

[73] Assignee: Weyerhaeuser Company, Tacoma, Wash.

[21] Appl. No.: 255,630

[22] Filed: Apr. 20, 1981

[51] Int. Cl.[3] .......... G20B 3/12

[52] U.S. Cl. .......... 350/418; 350/419; 350/319; 219/121 LR

[58] Field of Search .......... 350/418, 419, 453, 319; 356/138; 362/257, 259; 219/121 LR; 372/53, 55, 66

[56] References Cited

U.S. PATENT DOCUMENTS

| | | | |
|---|---|---|---|
| 3,403,348 | 9/1968 | Ashkin et al. . | |
| 3,435,363 | 3/1969 | Patel . | |
| 3,528,727 | 9/1970 | Halliday | 350/413 |
| 3,569,660 | 3/1971 | Houldcroft . | |
| 3,604,789 | 9/1971 | McLafferty . | |
| 3,617,928 | 11/1971 | Hausmann . | |
| 3,638,139 | 1/1972 | Ashkin et al. . | |
| 3,654,569 | 4/1972 | Hausmann . | |
| 3,685,882 | 8/1972 | Van Der Jagt . | |
| 3,817,604 | 6/1974 | Watt | 350/481 |
| 3,873,939 | 3/1975 | Guile et al. . | |
| 3,918,800 | 11/1975 | Griffin . | |
| 3,973,217 | 8/1976 | Guile . | |
| 3,973,218 | 8/1976 | Kepler et al. | 350/319 |
| 3,976,364 | 8/1976 | Lindemann et al. . | |
| 4,074,208 | 2/1978 | Mack et al. . | |
| 4,090,572 | 5/1978 | Welch . | |
| 4,112,388 | 9/1978 | McLafferty . | |
| 4,121,085 | 11/1978 | Diemer et al. . | |
| 4,138,777 | 2/1979 | Kepler et al. . | |
| 4,178,078 | 12/1979 | Hausmann . | |
| 4,201,952 | 5/1980 | Stewart et al. . | |

OTHER PUBLICATIONS

IEEE, May 1967, *Microwave Theory and Techniques* Acoustic Gas Lenses for Light.

Berreman, 1964 The Bell System Tech. Journal 43: 1476–1479, A Gas Lens Using Unlike, Counter Flowing Gases.

Marcuse et al., 1964 The Bell System Tech. Journal 43: 1759–1782, Analysis of a Tubular Gas Lens.

Miska, 1977 Materials Engineering 86(5): 50–52, The Focus is on Lasers for Fabricating Metal Products.

LaBuff, 1980 Report General Electric Co. pp. 1–5, Limit Parametric Study.

Campillo and Shapiro "Toward Control of Self Focusing" *Laser Focus* 10(6): 62–65.

Humphrey et al., *Vortex Devices* Fluidics 1965, pp. 186–188.

McCormack, 1975 *Proceedings of The Royal Irish Academy* Sect. A: 57–72.

Avidor, 1979 AIAA Journal, 17: 1267–1268, Improved Free Vortex, Subsonic, Aero-dynamic Window.

Otis et al., Canadian Journal of Physics 1974, 52: 257–264, Lensing Effect in Helical TEA Lasers.

Beck, 1964 The Bell System Tech. Journal, 43: 1818–1820, Thermal Gas Lens Measurements.

Beck, 1964 The Bell System Tech. Journal, 43: 1821–1825, Gas Mixture Lens Measurements.

Berreman, 1964 The Bell System Tech. Journal, 43: 1469–1475, A Lens or Light Guide Using Convectively Distorted Thermal Gradients in Gases.

*Primary Examiner*—Bruce Y. Arnold
*Assistant Examiner*—Paul M. Dzierzynski

[57] ABSTRACT

This invention is a method and apparatus for refracting a laser beam. The beam can be collimated, focused, or expanded by passing it along the longitudinal axis of a volume of gas which has a radial pressure gradient. The pressure gradient causes a corresponding gradient in density and refractive index. Such a gradient can conveniently be established by the use of a gas vortex chamber. A vortex chamber will act as a negative lens. It can be located at or near the focal point of a focused laser beam as a collimating element. A gas vortex lens is useable at power densities above those which conventional optical materials can withstand.

17 Claims, 15 Drawing Figures

*Fig. 13*
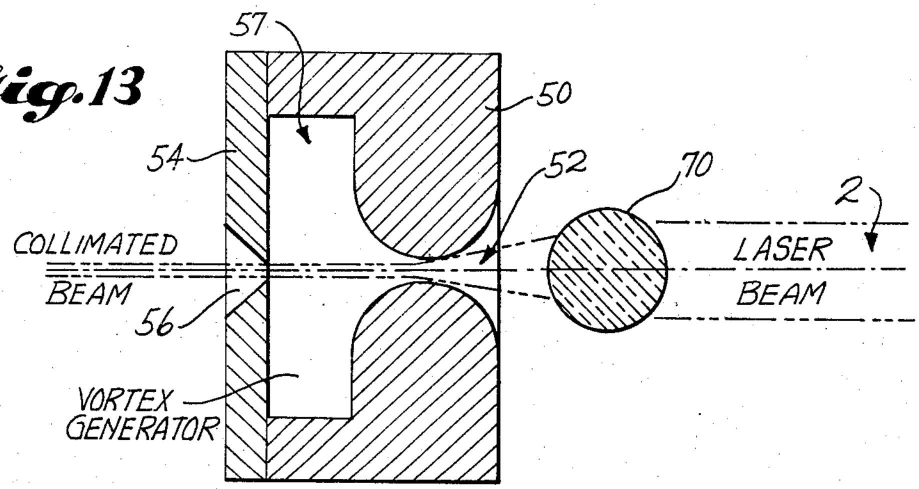
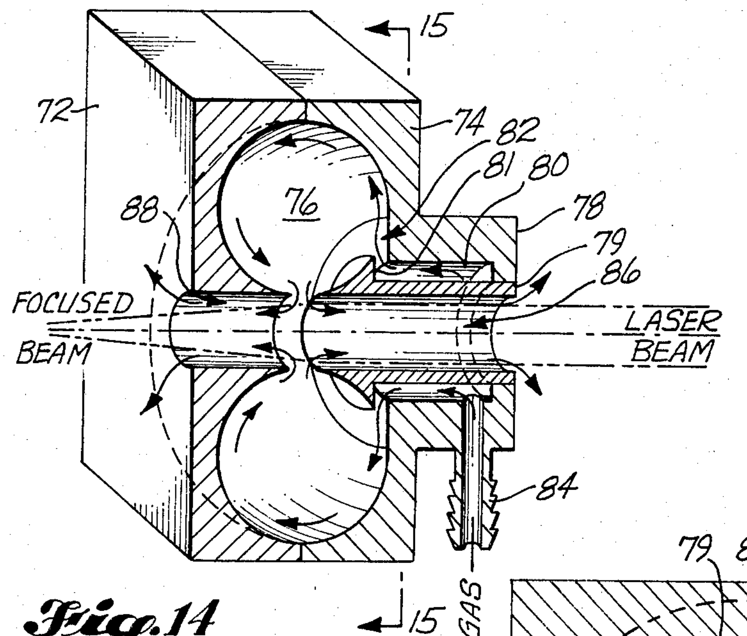
*Fig. 14*
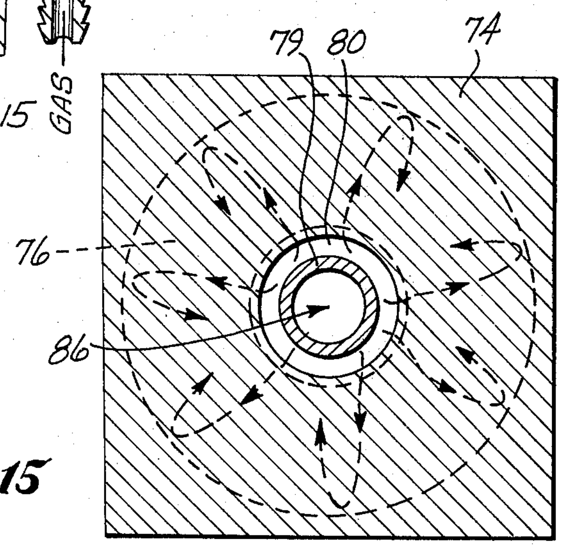
*Fig. 15*

METHOD AND APPARATUS FOR REFRACTING A LASER BEAM

FIELD OF THE INVENTION

This invention relates to a method and apparatus for refracting a laser beam. In a narrower sense, it comprises means by which a beam of laser light can be collimated, focused, or expanded without the need for conventional optical elements.

BACKGROUND OF THE INVENTION

It is often desirable to bring a laser beam to a point of focus in order to raise the power density. Certain cutting or spot welding operations might be cited as examples. Focusing can be done with a conventional positive lens when power levels are low. At higher power levels, liquid cooled spherical or parabolic metal mirrors are often employed for focusing. When the focused laser beam is performing an operation such as cutting or spot welding, the work piece must be rather precisely located at the focal point. The beam expands on either side of this point and the power density falls accordingly. The size of the spot at the focal point and the working distance on either side of the focal point, in essence the tolerable depth of the field, are controlled by conventional rules of optics as well as the characteristics of the particular laser.

The limitation which requires the work piece to be at the focal point causes many problems. These may be complex geometric difficulties as are encountered when cutting or welding a three dimensional object. There may also be serious technical limitations as when attempting to make a deep cut in some material. One example of this is in cutting wood in order to reduce conventional sawing losses.

A solution to the depth of field problem would be to recollimate a focused beam by using a negative lens at or near the focal point. To date, the technology to do this has not been available except for very low powered lasers. Conventional lenses are simply pierced by a high power density beam. This is a special case of a more general problem associated with passing high power density laser beams through transparent solid materials. It applies not only to lenses, but to laser windows as well.

Since no optical material is 100% transmissive, it will absorb and convert to heat some of the energy of the beam passing through it. As long as this heat can be removed, no damage will result. The problem arises when heat build-up is more rapid than dissipation. This problem has become more acute as the power of industrial lasers has risen with the development of improved technology.

Windows were one of the first areas where alternatives to conventional optical elements had to be found. A window is the opening where the beam leaves the laser device. It serves to keep the medium inside the laser separate from the outside environment and is required because the lasing medium is most usually a gas of different composition and pressure than that in the outside environment.

One solution to the problem of conventional window destruction by high power density laser beams has been the use of so-called aerodynamic windows. A gas curtain is passed at very high velocity, normally supersonic, across the window opening. Typical early examples are shown in McLafferty, U.S. Pat. No. 3,604,789; and in U.S. Pat. Nos. 3,617,928 and 3,654,569 to Hausmann.

In later developments, the gas curtain has assumed the form of a segment of a free vortex. The nozzle creating the supersonic gas curtain can be designed so that the gas pressure on the laser side approximates the pressure within the laser while the pressure on the outside is typically at normal air pressure. In this way there is little or no transfer of gas into or out of the laser. U.S. Pat. Nos. 3,873,939 to Guile et al.; 3,973,217 to Guile; and 3,973,218 and 4,138,777 to Kepler et al. are representative.

Many references speak of problems arising from distortion of the laser beam as it passes through the supersonic gas window. McLafferty, in U.S. Pat. No. 4,112,388, attempts to overcome this problem by using adjacent layers of two different gases in his supersonic window. In effect, he creates a refractive index gradient across the window to minimize boundary layer disturbances.

It should be noted that in those aerodynamic windows employing free vortex segments, the laser beam passes essentially radially through the vortex segment.

Two other aerodynamic window types are exemplary of different approaches at reducing distortion as the beam passes through the window. One is seen in U.S. Pat. No. 4,201,952 to Stewart et al. which describes a window for use with a large diameter annular laser beam. It too uses a curtain of two different but adjacent gases, but the configuration is that of a radially expanding annulus. Griffin, in U.S. Pat. No. 3,918,800, shows two axially impinging gas columns through which a coaxial laser beam passes.

Gaseous curtains have found other laser-related applications besides aerodynamic windows. Hausmann, in U.S. Pat. No. 4,178,078, describes a cylindrical aerodynamic containment means for achieving better control of the plasma in a flashlamp for exciting a pulsed laser. Mack et al., U.S. Pat. No. 4,074,208, show a vortical gas containment system to accomplish flashlamp plasma containment.

Problems associated with focusing and collimating systems have apparently been much more intractible than those relating to windows, if one can judge by the relative dearth of pertinent literature. Watt, in U.S. Pat. No. 3,817,604, shows a system using conventional optics for bringing a laser beam to a focus. Ashkin et al., in U.S. Pat. Nos. 3,403,348 and 3,638,139, and Patel in U.S. Pat. No. 3,435,363, teach applications of "thermal" focusing. The laser beam is transmitted through a volume of a gas varying radially in temperature and thus also varying somewhat in index of refraction. If the temperature at the periphery is cooler than that at the axis, the effect is that of a weak negative lens. If the opposite situation holds and the peripheral temperature is higher, the effect is that of a weak positive lens. Welch, in U.S. Pat. No. 4,090,572, takes advantage of the positive lens effect to counteract divergence of a laser beam as it is projected down a deep borehole.

Brief comment is made here about the so-called "self-focusing" effect in lasers so that it is not confused with the present invention. The refractive index of any transmissive material varies with the intensity of the beam travelling through it. Because of this intensity dependence there is a tendency for a high power density beam having a gaussian energy distribution to collapse into a single spot because it is travelling slower in the center than along the edges. While some investigators have sought to take advantage of this characteristic, most have seen it as a problem to be overcome. The complex nature of this problem is reviewed by Campillo and Shapiro, Laser Focus, June, 1974, pp. 62–65.

Several other patents might be mentioned as having peripheral relationship to the present invention. Houldcroft, in U.S. Pat. No. 3,569,660; VanDer Jagt, in U.S. Pat. No. 3,685,882; and Diemer et al., in U.S. Pat. No. 4,121,085; all show gas-assisted lenses or nozzles for use in laser welding or cutting operations. These contain a positive lens for bringing the laser beam to a point of focus and a means for sweeping gas across the lens to cool and protect it by removing any vaporized products from the vicinity.

It is clear from a study of the literature that no consideration has been given to the use of a gaseous medium as a focusing device by any means other than establishment of a thermal gradient. The gas thermal lens, at best, shows only a small change in refractive index from axis to margin. It also poses many mechanical limitations as to where and how it can be used. These two considerations, taken together, have resulted in only very limited application of the thermal lens principle. Perturbations and disturbances in beam integrity have been noted where pressure gradients were encountered. However, the entire thrust of the prior art has been to seek means to eliminate this problem rather than to consider ways in which it might be used to advantage.

SUMMARY OF THE INVENTION

This invention relates to a method and apparatus for refracting a laser beam. To accomplish this result, it employs a volume of gas through which the laser beam passes in an axial relationship. A radially differing pressure gradient is established and maintained within the volume of gas. Depending upon the effect to be obtained and the means used to achieve the pressure gradient, the pressure may be made to increase radially or decrease radially. Associated with the pressure gradient is a corresponding gradient in density and refractive index. Thus, the volume of gas can serve to effectively refract a beam of coherent light passing along its longitudinal axis. In the situation where the pressure increases radially from the axis, the effect on a laser beam is that of a negative lens. In the case where the pressure decreases radially from the axis, the effect on the laser beam is that of a positive lens.

A preferred means of achieving a radial pressure gradient is the use of a gas vortex chamber. This will have one or more gas inlet ducts which enter the chamber at or near its circumference in an essentially tangential manner. The chamber will normally contain two small axial bores or apertures which permit the gaseous medium to egress. By changing the inlet pressure of the gas, velocity within the chamber and bores can be varied. In effect, this also changes the refractive index gradient across the bores. By means of pressure variation or control, a lens of greater or lesser power or focal length can be readily created.

A lens of the type just generally described can be used with particular effectiveness as a negative lens to collimate a laser beam. The beam will normally be focused by some means such as a positive lens or a parabolic or spherical mirror. By locating the gas vortex chamber at or near the focal point, the exit beam may be collimated so that it changes very little from its diameter at the focal point. In this way, the power density of a laser beam can be greatly increased and maintained more nearly constant for considerable distances from the exit side of the vortex chamber so as to greatly extend the useful working distance of a laser beam for many of the applications which it is called upon to perform. The gas vortex chamber may also be adapted to serve as a combination window and focusing or collimating device for a laser.

The present invention overcomes many of the limitations possessed by conventional optical elements when used in the path of a high-power density layer beam.

It is an object of this invention to provide a method and apparatus for refracting a beam of laser light by the use of a pressure gradient in a gaseous medium.

It is a further object to use a gas vortex chamber that can serve as a lens for high-power density laser beam.

It is yet another object to provide a means for collimating a laser beam focused to a small spot of high-power density.

It is another object to provide a refractive element for a laser beam which will not be damaged at very high power levels.

It is still another object to provide a means for greatly extending the usable working distance around the focal point of a laser beam.

It is yet a further object to provide a simple and inexpensive means for refracting a laser beam.

These and other objects will become readily apparent to one skilled in the art upon reading the following detailed description in conjunction with the drawings.

BRIEF DESCRIPTION OF THE DRAWINGS

FIG. 13 is a diagrammatic cross-sectional view of a vortex collimating lens used with a self-aligning spherical focusing lens.

FIG. 14 is an isometric view, partially in cross-section, of a toroidal vortex generator having a high pressure in the axial region and capable of acting as a positive lens.

FIG. 15 is a cross-section along line 15—15 of FIG. 14 showing a plan view, partially hidden, of the toroidal vortex generator.

DESCRIPTION OF THE PREFERRED EMBODIMENTS

Figure 1:
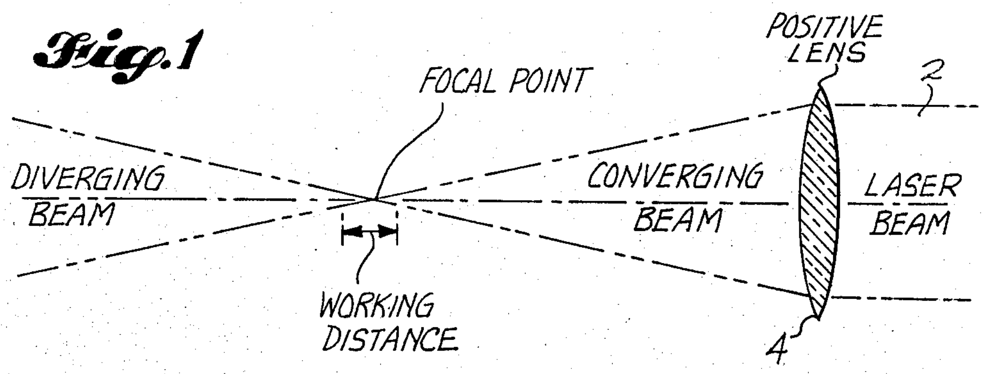
FIG. 1 is a diagrammatic cross-section of a laser beam being brought to a point of focus by a conventional positive lens.

The use of lasers in industrial applications has increased rapidly due in part to increased electrical efficiencies and the development of specialized optical materials to handle increased beam intensities. Laser application requirements range from power densities in the neighborhood of tens of watts/cm$^2$, such as in photo deposition in the semi-conductor industry, to billions of watts/cm$^2$. Most applications fall between these extremes in the range of hundreds to millions of watts/cm$^2$. These applications include surface hardening of metals; surface ablation or engraving of metals, ceramics, and other materials; metal welding; and non-contact cutting or drilling of various materials. To achieve these energy densitites in a continuous wave or pulsed laser, the beam is usually extracted from the resonant cavity at a relatively low power density to void damaging the reflecting surfaces forming the lasing cavity. Once the beam is external to the laser, it can be optically modified for whatever purpose is desired. To increase the power density of the beam, the output from the laser may be passed through a positive or focusing lens. Alternatively, it may be focused by using a spherical or parabolic mirror. For the purposes of the present invention, these two means of focusing can be considered as equivalent. After passing through the positive lens, the beam converges to a minimum diameter at the point of focus, where the energy density is greatest, and then diverges at the same angle as the incoming beam. This is shown in FIG. 1 where a laser beam 2 is brought to a point of focus by a positive lens 4. For the sake of simplicity, the positive lenses are shown as a simple meniscus in the drawings. In many applications, it may be desirable to use a more complex lens corrected for the various aberrations found in the simple meniscus lens.

Figure 2:
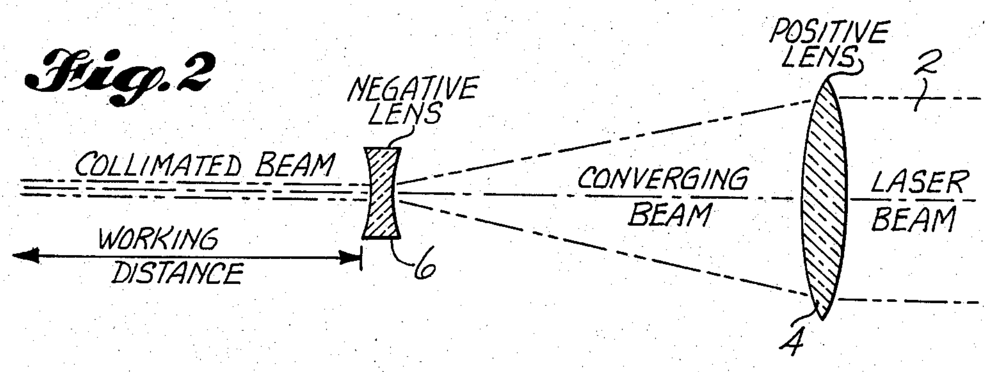
FIG. 2 is a diagrammatic cross-section of a laser beam being brought to a point of focus by a positive lens and collimated into a beam of smaller than original diameter by a negative lens.

Typically, the power density of the beam will be adequate for the application desired only within a narrow range on either side of the point of focus. This is the working distance, or depth of field, characteristic of the particular optical system and laser device being used. The short working distance poses many complications. With low-powered lasers this distance can be extended by inserting a negative lens 6 at the focal point, as is shown in FIG. 2. By choosing an appropriate negative lens power, the beam can be collimated. A collimated beam is one in which the margins of the beam are essentially parallel.

Figure 3:
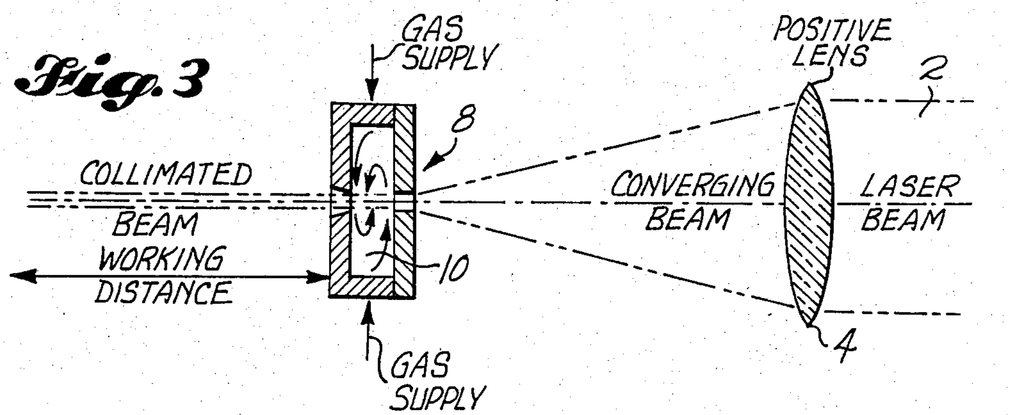
FIG. 3 is a diagrammatic cross-section of a laser beam being brought to a point of focus by a conventional positive lens and collimated by means of a gas vortex chamber.

Collimation using standard optical elements is satisfactory only for very low-powered lasers. At higher power levels, the negative lens will be readily cratered or even pierced if located at the high-power density focal point. The present invention includes a method and apparatus which solves the problem of a negative lens being destroyed by absorption of energy from the laser beam. This involves locating a gas vortex chamber at approximately the focal point of the laser beam. The vortex chamber is located so that its axis is coincident with the optical axis of the laser beam. In FIG. 3 the converging laser beam enters the proximal aperture of a vortex lens generally indicated at 8. A rapidly vortexing gas within the chamber 10 creates a density gradient across the bore axis which serves as an effective negative lens. Typically, the gases are introduced tangentially into a circular chamber with outlets at the center of each face. The gases escape through the bore or aperture and in doing so, by conservation of angular momentum, increase the angular velocity in the bore. The spin imparted to the gas creates a pressure and density gradient radial to the bore axis. It is known that as the density of the gas increases, so does the refractive index. As a consequence, a refractive element has been created due to the density gradient. Since gas is being continually introduced and exhausted through this "gas lens," any energy absorbed by the gas, which may tend to heat it, is rapidly swept away.

Figure 4:
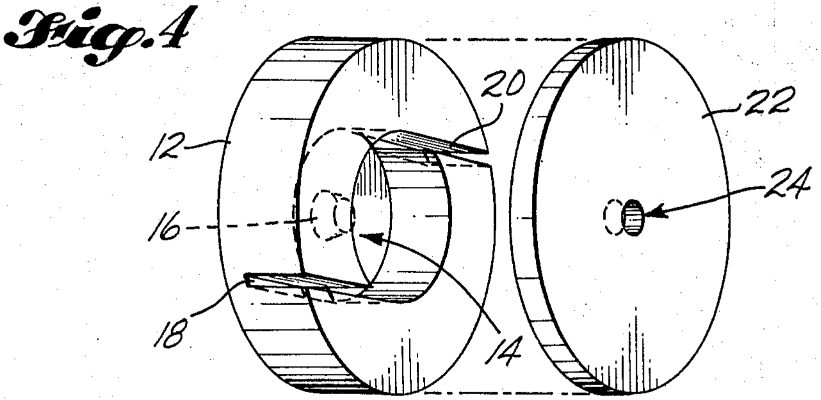
FIG. 4 is an exploded isometric view of one version of a gas vortex chamber useful as a refracting element.

FIG. 4 shows the elements of a typical vortex chamber. Such a chamber consists of a body portion 12 into which has been machined a cavity or vortex chamber 14. Centrally located within the chamber is a bore or aperture 16. Tangential slots 18, 20 serve as entry conduits for the gaseous medium. It will be readily apparent that the number of tangential slots is not a critical feature of the invention. This will normally be empirically determined by the geometric parameters of the specific device. The vortex chamber is closed by a cover plate 22 which also contains a centrally located bore or aperture 24. Depending on the location of the device in relation to the focal point, and on the power density, the cover plate may alternatively be an optically transparent material, such as glass.

Figure 5:
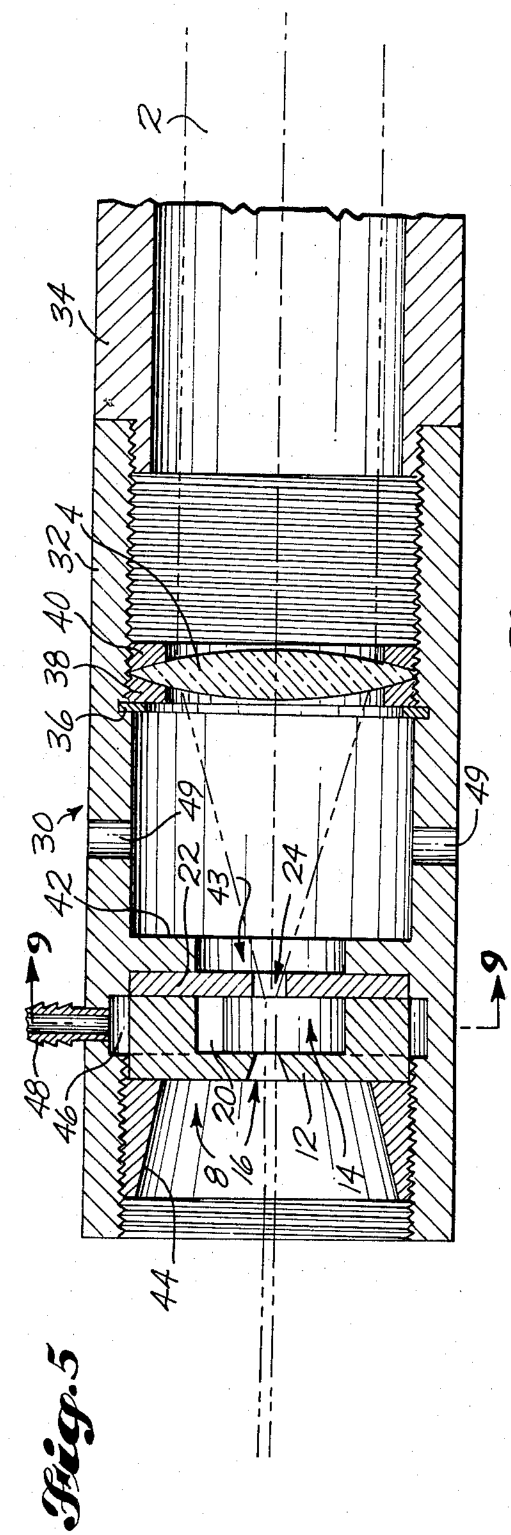
FIG. 5 is a cross-sectional view of a focusing and collimating device using a vortex chamber as the negative lens element.
Figure 6:
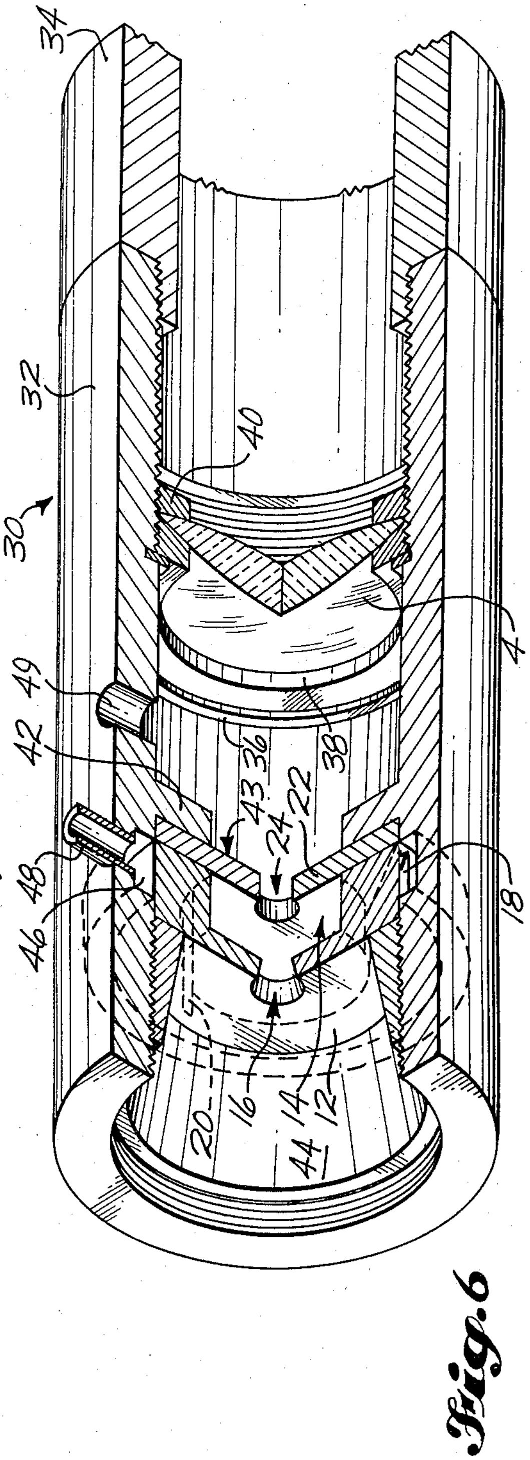
FIG. 6 is an isometric partially cut away view of the focusing and collimating device shown in FIG. 5.
Figure 9:
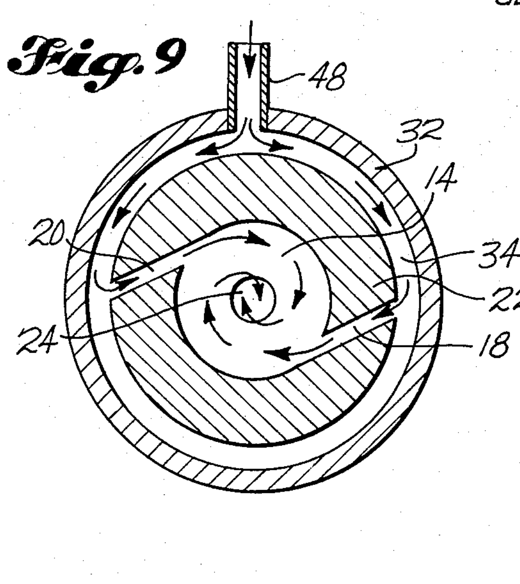
FIG. 9 is a cross-sectional view of the vortex chamber taken along line 9—9 of FIG. 5.

FIGS. 5, 6, and 9 show in more detail a focusing and collimating device as it would actually be used in conjunction with a laser. A device of this general type was used in the subsequent examples. The focusing device is generally indicated at 30. It comprises a mounting tube 32, which is threaded or otherwise machined to couple with an appropriate output fitting 34 on the laser device. The tube has an internal shoulder which holds a retainer ring 36 and a threaded retainer 38. Positive lens 4 is rigidly held against ring 38 by a second threaded retainer ring 40. Tube 32 has another internal shoulder 42 that serves as a retainer for the gas vortex chamber, generally indicated as 43. Threaded retainer 44 holds the vortex chamber rigidly in place. Mounting tube 32 contains a plenum 46 at the location of the vortex chamber. Gas supply to the plenum and chamber is supplied through nipple 48. Gas vented from the proximal bore 24 is exhausted through vent holes 49. The vortex chamber represented here is identical with that shown in FIG. 4.

There are a number of interrelated variables which govern the optical characteristics of the vortex lens. Typically, gas pressure, bore length, the diameter of the bore or aperture, and the composition of the particular gas all affect performance. By varying the gas pressure, the angular velocity is changed, thereby changing the density gradient and the power or focal length of the lens. The bore length will determine the effective refracting depth of the device, while the bore diameter or aperture controls the angular velocity for any given gas pressure. Refracting power of the device is also in part determined by the refractive index of the particular gas being used. As an example, helium has a refractive index very near unity, while that of the chlorofluoro hydrocarbons will be very much higher. The invention is not limited to the use of any particular gas. Carbon dioxide has been found to be very effective, but other gases, such as air or nitrogen, are also suitable.

One of the advantages of this particular invention is the very low volume of gas required as compared, for example, with an aerodynamic window. The bore diameters may be as low as 0.1–0.2 mm, while chamber diameters can be in the range of 2–3 mm. It must be understood that these dimensions are exemplary and should not in any way be construed as limiting. A ratio of vortex chamber diameter to outlet bore diameter of about 10:1 has been found to be satisfactory. When the vortex chamber is cylindrical, a ratio of length/diameter in the range of about 0.10 to 0.15 has also given excellent results. With vortex lenses having these parameters, gas usage can be in the range of a few milliliters per second at standard temperature and pressure. It should be noted that it is in the bores where refraction takes place and not within the peripheral portion of the chamber.

Figure 7:
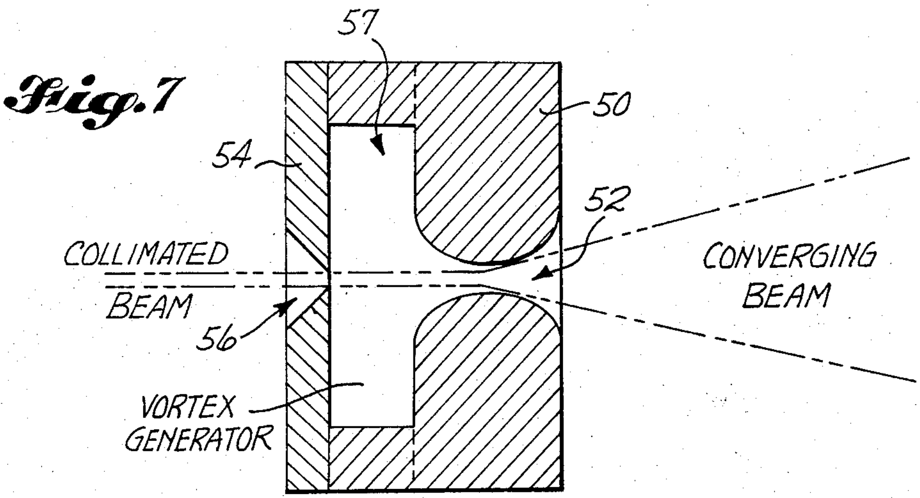
FIG. 7 is a diagrammatic sectional view of another version of a gas vortex chamber.

While it has been shown that straight through bores work extremely effectively, these may not necessarily be an optimum configuration. Certain theoretical considerations point to a configuration as shown in FIG. 7 as potentially being somewhat more effective. This chamber has a body portion 50 containing a bore or aperture 52 which is rounded on both edges. The cover plate 54 likewise has an aperture 56 which has been eased on the downstream side. Cavity 57 is identical with that shown in the other drawings. By constructing the vortex chamber in this manner, the effective bore length is kept very short. In the example of FIG. 7, the transition from vortex generator to bore is less abrupt and would not have the overall wall resistance of the other types. It should also be observed that here the bore shape allows a larger entrance area for the converging beam.

The description of the vortex lens thus far has been of its use as a collimating element. It should be apparent to one skilled in the art that the gas lens also has the capability of expanding a light beam already collimated. If a parallel-sided beam enters the device, it will be expanded to some larger diameter. By using a positive lens downstream, the beam could again be collimated. This is the equivalent of the reverse telescope devices currently used as beam expanders.

One major advantage of a vortex lens is its apparent insensitivity to wave length of the laser light. It appears to be equally effective for wave lengths extending from the near infrared, through visible and into the near ultraviolet light range. The particular gas chosen for use may depend somewhat on its refractive index at the wavelength of the laser being employed.

Figure 8:
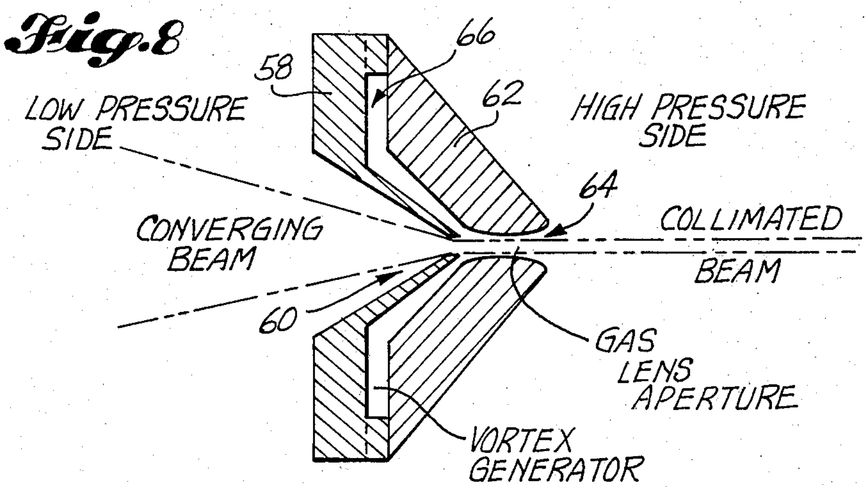
FIG. 8 is yet another diagrammatic cross-section of a vortex chamber which can also act as a laser window.

It is possible for the device of the present invention to function both as a window and a refracting element. FIG. 8 shows a configuration which will serve for this purpose when used with a laser having an internal pressure below that of its external environment. In essence, this device is a vortex venturi. The beam may be brought to a focus from within the laser device itself by the use of a spherical mirror or other means. The vortex lens here consists of a body portion 58 with bore or aperture 60 and a conical cover plate 62 containing an exit aperture 64. The internal cavity or vortex chamber 66 is in the form of a flanged cone. Geometry of the device can be controlled so that there will be a relatively minimum flow of gas from the laser cavity in to the vortex chamber, or from the vortex chamber into the laser.

FIG. 13 shows another version of the device. In this case, the vortex lens has a configuration identical with that of the one shown in FIG. 7. The particular configuration is not critical. However, the focusing lens in this case is a spherical lens 70. It can be held optically centered and suspended within the exiting stream of gas by the Bernoulli principle. The spherical lens may be made of glass, acrylic, or other optical materials. The position with regard to the vortex chamber is controlled by its diameter and by the volume of gas leaving the chamber.

Figure 10:
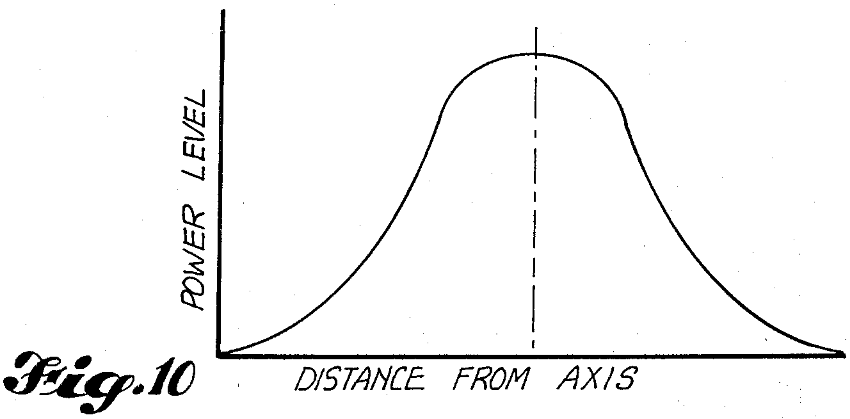
FIG. 10 is an idealized graphical representation of the power distribution within a typical laser beam.
Figure 11:
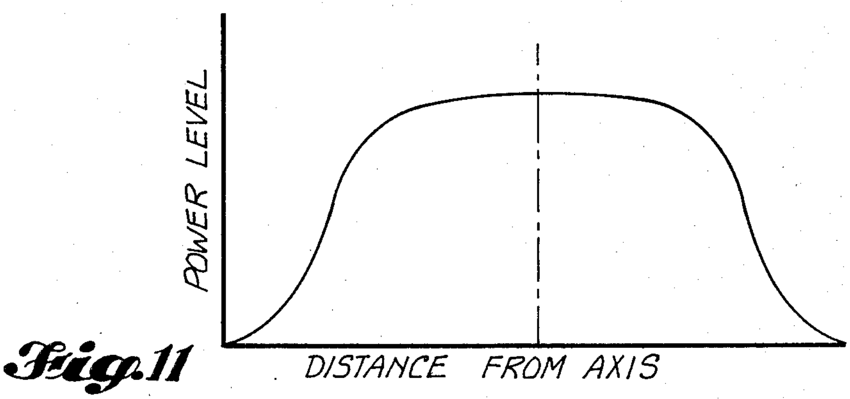
FIG. 11 is an idealied graphical representation of the power distribution made possible using one version of the present invention.
Figure 12:
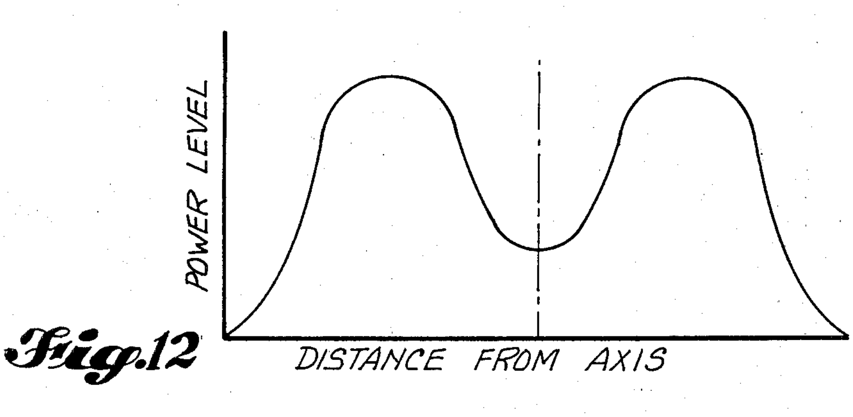
FIG. 12 is also an idealized graphical view showing another power distribution made possible by the use of a vortex chamber.

Experiments have shown that the energy distribution within the beam exiting from a vortex lens can be varied over wide configurations. This can be accomplished to some degree simply by adjusting gas pressure without any change in the physical parameters of the device. Optical measurements have shown that most typically the exiting beam has a normal distribution as shown in FIG. 10. However, variation of gas pressure or chamber geometry enables the production of a beam having a near square wave configuration as of FIG. 11. It is also possible to produce an annular beam, as in FIG. 12, from an incoming beam having a normal distribution. The reasons for this are not yet fully understood.

The vortical lens is not limited to use as a negative lens. A version that can function as a positive or focusing lens is shown in FIGS. 14 and 15. In this case the highest pressure is along the beam axis with the pressure decreasing radially from this location. The vortex here is caused to assume a toroidal form, in comparison to the flat- or wheel-shaped vortex shown earlier. Referring to the figures, body portions 72, 74 define an internal toroidal cavity 76. Portion 74 contains a neck or stem section 78. An internal member located concentrically within the neck defines an annular portion 80 at is proximal end. The distal end of this member is faired to match the curvature of the toroidal cavity. The faired portion has a shoulder 81 which, along with body portion 74, defines a nozzle 82. The nozzle communicates with the plenum 80 which, in turn, is in communication with a nipple 84. Nipple 84 serves to admit pressurized gas into the system from a source, not shown. The toroidal lens has a beam inlet bore or aperture 86 and exit bore or aperture 88. However, it will be apparent to one skilled in the art that the beam could enter from either end. This applies to any of the other examples as well. In the illustration shown, a collimated beam from the laser or other source enters the device from the right side and is brought to a focus on the left. Of course, the reverse effect is equally possible and an entering diverging beam can be collimated. The amount of refraction achieved will depend on the effective focal length of the device.

EXAMPLE 1

The laser source for this example is a model 553A argon laser manufactured by Control Laser Corporation of Orlando, Fla. It is an ion-type laser with a rated beam output of six watts. This laser is made with external mirrors and Brewster windows located at both ends of the plasma tube. The vertically polarized laser beam exits through a mirror of 88% reflectance. The laser beam has a diameter of approximately 2 mm and wavelengths between 514 and 351 nm, with a beam divergence of 0.6 mRAD. The beam was focused with a 50 mm focal length glass lens using the configuration shown in FIG. 5 or 6. The vortex chamber has a diameter of 3.3 mm and a depth of 0.508 mm. The inlet bore has a diameter of 0.35 mm and a length of 2.29 mm, while the exit bore has a similar diameter and a length of 0.762 mm. In this example, the exit bore was not expanded into a truncated cone as shown in FIG. 5 or 6, but was cylindrical. Using compressed air at 165.5 kPa, a spot-size estimated at 0.13 mm could be obtained approximately 20 cm away. The same effect was achieved using carbon dioxide as the gas at a pressure of only 103 kPa. Using this device, a hole could be burned through Douglas-fir veneer having a thickness of approximately 3 mm in a time of approximately 2 seconds up to a distance as far as 10 cm away from the exit of the vortex lens. When no vortex lens was used and the veneer was placed at the focal point of the positive lens, the working distance was limited from 2–3 mm or either side of the focal point. Veneer can be readily cut by moving it slowly across the laser beam.

EXAMPLE 2

The laser described in Example 1 was used with a positive lens of 65 mm focal length. The vortex chamber was machined to a chamber diameter of 2.38 mm and a depth of 0.254 mm. The bore on the proximal or beam inlet side is cylindrical in configuration and has a diameter of 0.33 mm and length of 1.02 mm. On the distal, or beam outlet side, the bore is also of cylindrical configuration with a diameter of 0.23 mm and a length of 0.254 mm. Carbon dioxide was used as the gas at a gauge pressure of 420.5 kPa.

When no gas was being supplied to the lens, the laser projected a spot 140 mm in diameter at a distance of 4.57 m. With gas supplied to the lens, the spot size was reduced to 14 mm in diameter with only minor light scattering outside this area. The beam could burn through Douglas-fir veneer approximately 3 mm thick at distances as great as 53 cm from the exit aperture of the gas lens.

There are many applications within the forest products industry where laser cutting will now be practical with the advent of an extended working distance. One area is in corrugated board, where very smooth and precise cuts can now be made without crushing the product. Similar operations can now be done on particle or fiber felts used in the manufacture of composite wood products. It is expected that rapid and precise cutting of larger shapes of wood can be readily done by using a higher powered laser device in conjunction with the vortex lens. Many other applications in other areas of technology will be readily apparent to those skilled in the art. Besides the cutting, welding, and boring uses already described, it is easy to envision many other applications such as communications, surveying, and induction of chemical reactions to name but a few.

Applicant's belief that radial pressure differences across the gaseous medium are responsible for the observed effect on laser beams is based on theoretical consideration of the nature of vortices. However, the nature of the systems employed in the examples is such as to make empirical confirmatory measurements virtually impossible. Other factors besides pressure gradient may be at work as well. For example, the gas in the vortex chambers and their axial bores or apertures may assume sonic velocities. If this is the case, a standing shock wave should form and this may, in part, contribute to the effects observed. Other effects not now known or anticipated may be at work as well.

It should be evident to one skilled in the art that many changes and modifications can be made in the configuration or uses of the vortex lens without departing from the spirit of the present invention.

What is claimed is:

1. A method for increasing the useful working distance from the focal point of a beam of laser light delivering energy to a material comprising:

a. bringing the beam of laser light to a point of focus, and b. locating a gas vortex lens comprising a vortex chamber near the focal point, and c. providing inlet and outlet bores in the chamber of smaller diameter than the chamber through which the gas egresses, the bores being located on the optical axis so that the beam passes axially through a gaseous medium vortexing in the bores with sufficient velocity to create a negative lens and effectively reduce the angle of divergence of the beam past the focal point.

2. The method of claim 1 in which the vortex chamber serves to essentially collimate the beam in order to maintain power density more nearly constant beyond the focal point.

3. The method of claim 2 in which the laser beam is employed in a cutting operation.

4. The metod of claim 2 in which the laser beam is employed in a welding operation.

5. The method of claim 2 in which the laser beam is employed in a piercing operation.

6. The method of claim 2 in which the laser beam is employed in a surface treatment operation.

7. The method of claim 1 in which the vortex lens contains a vortex chamber having axial inlet and outlet portions of smaller diameter than the chamber.

8. The method of claim 7 in which the ratio of vortex chamber diameter to the outlet portion diameter is about 10:1.

9. The method of claims 7 or 8 in which the vortex chamber is cylindrical.

10. The method of claim 9 in which the ratio of length to diameter of the vortex chamber is about 0.10 to 0.15.

11. The method of claims 7 or 8 in which the vortex chamber is conical in configuration.

12. The method of claim 1 in which the vortex chamber further serves as a gas window for a laser.

13. The method of making a positive gas lens which comprises establishing a pressure gradient across the axis of a toroidal vortex chamber within a volume of gas in which the pressure decreases radially from the optical axis of the lens, said pressure differential being sufficient to cause effective refraction of a beam of laser light passing through the lens.

14. The method of claim 13 in which the lens is used to bring a beam of laser light to a point of focus.

15. Apparatus for reducing the diameter and angle of divergence of a beam of laser light comprising in combination a. means for bringing the laser beam to a point of focus, and b. gas vortex chamber means located near the focal point in such a manner that the axis of the vortex chamber is on the optical axis of the light path, the vortex chamber comprising a body portion, into which a gas is introduced essentially tangentially, and axially located inlet and outlet bore portions of smaller diameter than the body portion through which the vortexing gas is vented.

16. The apparatus of claim 15 in which the vortex chamber is cylindrical in form.

17. The apparatus of claim 16 in which the vortex chamber is conical in form and is situated with the base portion of the cone disposed toward the focusing means.

* * * * *